United States Patent
Diede et al.

(10) Patent No.: US 6,295,018 B1
(45) Date of Patent: Sep. 25, 2001

(54) LOW POWER RADAR LEVEL INSTRUMENT WITH ENHANCED DIAGNOSTICS

(75) Inventors: Kurt C. Diede, Apple Valley; Eric R. Lovegren, Big Lake, both of MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/407,041

(22) Filed: Sep. 27, 1999

(51) Int. Cl.$^7$ ................................................ G01S 13/08
(52) U.S. Cl. .................................. 342/124; 73/290 R
(58) Field of Search ............................ 342/124, 173, 342/174, 175; 73/290 R, 866.5

(56) References Cited

U.S. PATENT DOCUMENTS

| | | | |
|---|---|---|---|
| 3,665,466 | 5/1972 | Hibbard | 343/12 R |
| 3,812,422 | 5/1974 | De Carlos | 324/58.5 |
| 3,900,260 | 8/1975 | Wendt | 356/5 |
| 3,995,212 | 11/1976 | Ross | 324/58.5 B |
| 4,044,355 | 8/1977 | Edvardsson | 343/14 |
| 4,161,731 | 7/1979 | Barr | 343/14 |
| 4,435,709 | 3/1984 | Kipp | 343/14 |
| 4,972,386 | 11/1990 | Lau | 367/99 |
| 5,157,337 | 10/1992 | Neel et al. | 324/632 |
| 5,327,139 | 7/1994 | Johnson | 342/22 |
| 5,365,178 | 11/1994 | Van der Pol | 324/644 |
| 5,440,310 | 8/1995 | Schreiner | 342/124 |
| 5,500,649 | 3/1996 | Mowrey et al. | 342/22 |
| 5,609,059 | 3/1997 | McEwan | 73/290 R |
| 5,610,611 | 3/1997 | McEwan | 342/89 |
| 5,614,911 | 3/1997 | Otto et al. | 342/124 |
| 5,656,774 | 8/1997 | Nelson et al. | 73/290 |
| 5,659,321 | 8/1997 | Burger et al. | 342/124 |
| 5,661,251 | 8/1997 | Cummings et al. | 73/866.5 |
| 5,672,975 | 9/1997 | Kielb et al. | 324/644 |
| 5,726,578 | 3/1998 | Hook | 324/643 |
| 5,734,346 | 3/1998 | Richardson et al. | 342/124 |
| 5,835,053 | 11/1998 | Davis | 342/22 |
| 5,847,567 | * 12/1998 | Kielb et al. | 324/642 |
| 5,898,308 | 4/1999 | Champion | 324/643 |
| 6,130,637 | 10/2000 | Meszaros et al. | 342/124 |
| 6,166,681 | 12/2000 | Meszaros et al. | 342/124 |
| 6,184,818 | 2/2001 | Meinel | 342/124 |

FOREIGN PATENT DOCUMENTS

| | | |
|---|---|---|
| 0882956 A2 | 5/1998 | (EP) . |
| 0882957 A2 | 5/1998 | (EP) . |
| 0 928 974 A2 | 7/1999 | (EP) . |
| 09069731A | 3/1997 | (JP) . |
| 697940A | 3/1997 | (SU) . |
| WO 97/06448 A1 | 2/1997 | (WO) . |

OTHER PUBLICATIONS

"Time Domain Reflectometry Tackles Tough Tank Level Measurements", *Flow, Level & Pressure Control*, pp. 33–35 (Nov. 1997).

"Measuring Process and Storage Tank Level with Radar Technology", IEEE International Radar Conference, pp. 256–260 (1995).

(List continued on next page.)

Primary Examiner—John B. Sotomayor
(74) Attorney, Agent, or Firm—Westman, Champlin & Kelly, P.A.

(57) ABSTRACT

A low power radar level instrument with enhanced diagnostics is disclosed. A microwave transceiver generates a microwave signal that travels along a termination, through a reference impedance discontinuity, and into a process product interface. A first portion of the signal is reflected by the reference impedance discontinuity, and a second portion is reflected by a process product interface. A diagnostic signal is provided based upon a characteristic of the first reflected portion. A level output is provided based upon the first and second reflected portions.

21 Claims, 5 Drawing Sheets

OTHER PUBLICATIONS

"Radar Level Technology Offers Accurate, Noncontact Measurements", *Flow, LEVEL, Pressure*, pp. 27–30 (Jan. 1996).

"Novel Methods of Measuring Impurity Levels in Liquid Tanks", IEEE MTT–S International Microwave Symposium Digest, US, New York, IEEE, pp. 1651–1654 (1997).

"Micropower Impulse Radar Technology and Application", Mast et al., U.S. Dept. of Energy, Lawrence Livermore national Laboratory, UCRL–ID 130474 (Apr. 14, 1998).

"Reflex–Radar Gauging and Level Measurement for Liquids, Interface and Granular Materials", Technical Data (12/96).

"Gauging and Level Measurement for Liquids, Interface and Granular Materials", *Reflex–Radar*, Krohne, Technical Data BM 100, BM 100 EEx (Dec.1996).

"Eclipse Guided Wave Radar", Magnetrol, pp. 1–2 (Jul. 23, 1998).

"Approval Standard Intrinsically Safe Apparatus and Associated Apparatus for use in Class I, II and III, Division 1 Hazardous (Classified) Locations", Factory Mutual Research, Class No. 3610, pp. 1–32 (Oct. 1998).

"Measuring Fluid Levels with Radar", by Steven Ashley, *Mechanical Engineering*, pp. 82–83 (Jan. 1996).

"Worlds Fastest Solid–State Digitizer", Lawrence Livermore National Laboratory, *Energy & Technology Review*, pp. S1–S6 (Apr. 1994).

"Low–Cost Wideband Spread–Spectrum Device Promises to Revoluionize Radar Proximity Sensors", *Technology Advances*, Electronic Design (Jul. 25, 1994).

* cited by examiner

LOW POWER RADAR LEVEL INSTRUMENT WITH ENHANCED DIAGNOSTICS

BACKGROUND OF THE INVENTION

The process control industry employs process variable transmitters to monitor process variables associated with substances such as solids, slurries, liquids, vapors, and gasses in chemical, pulp, petroleum, pharmaceutical, food and other processing plants. Process variables include pressure, temperature, flow, level, turbidity, density, concentration, chemical composition and other properties. A process variable transmitter can provide an output related to the sensed process variable over a process control loop to a control room, such that the process can be monitored and controlled.

The process control loop can be any configuration of two or more conductors that are capable of passing signals related to process information. For example, the process control loop can be a two-wire, 4–20 mA process control loop. A process variable transmitter coupled to such a process control loop controls the amount of current flowing through the loop such that the current corresponds to the process variable. In some process control loop embodiments, the energization levels can be low enough that even under fault conditions the loop generally will not contain enough electrical energy to generate a spark. This facilitates compliance with the intrinsic safety specification as set forth in the Factory Mutual Approval Standard entitled "Intrinsically Safe Apparatus and Associated Apparatus for Use in Class I, II, and III, Division 1 Hazardous (Classified) Locations," Class Number 3610, published October 1988. Intrinsic safety compliance is particularly relevant in flammable environments because such compliance ensures such low power levels that the possibility of undesirable spark generation is reduced. Low power process variable transmitters can operate on such low energy levels that they can receive all required electrical power from a 4–20 mA process control loop. The process control loop may also have digital signals superimposed on the loop according to a process industry standard protocol such as the HART® digital protocol.

Low Power Time Domain Reflectometry Radar (LPTDRR) instruments have been used recently to measure the level of products (either liquids or solids) in storage vessels. In Time Domain Reflectometry, electromagnetic energy is transmitted from a source, along a microwave waveguide (also known as a termination), and is reflected at a discontinuity. The travel time of the received energy is based on the media through which it travels as well as the distance traveled. One type of LPTDRR is known as Micropower Impulse Radar (MIR), which was developed by the Lawrence Livermore National Laboratory.

Low power radar level instruments, such as radar level transmitters, that are used in the industrial marketplace see many harsh environmental conditions. In some installations, transmitters can be subject to vibration, and/or extreme temperature swings. Such conditions can adversely affect the physical coupling between the microwave generation circuitry and the waveguide. As the coupling degrades, or is severed, the ability of the transmitter to provide an indication of process product level is adversely affected. Additionally, if the waveguide is submerged in process product, error can be caused in the level output.

As process product level measurement technology advances, there is a need to provide radar level measurement instruments that can identify conditions where accuracy and precision of the level output has degraded. Such an instrument would provide enhanced process control and maintenance because instrument error conditions would be quickly identified and remedied instead of creating erroneous level outputs.

SUMMARY OF THE INVENTION

A low power radar level instrument with enhanced diagnostics is disclosed. A microwave transceiver generates a microwave signal that travels along a termination, through a reference impedance discontinuity, and into a process product interface. A first portion of the signal is reflected by the reference impedance discontinuity, and a second portion is reflected by a process product interface. A diagnostic signal is provided based upon a characteristic of the first reflected portion. A level output is provided based upon the first and second reflected portions.

Features of the invention provide significant advances over the art. A low power radar level instrument can now provide diagnostics regarding the termination that extends into a process product. Such diagnostic information facilitates more effective system maintenance, as well as more accurate process control.

DETAILED DESCRIPTION OF THE EMBODIMENTS

Although the present invention will be described with reference to embodiments of low power radar level transmitters and the manner in which diagnostics are provided, workers skilled in the art will recognize that changes may be made in form and detail without departing from the spirit and scope of the invention, which are defined by the appended claims.

Figure 1:
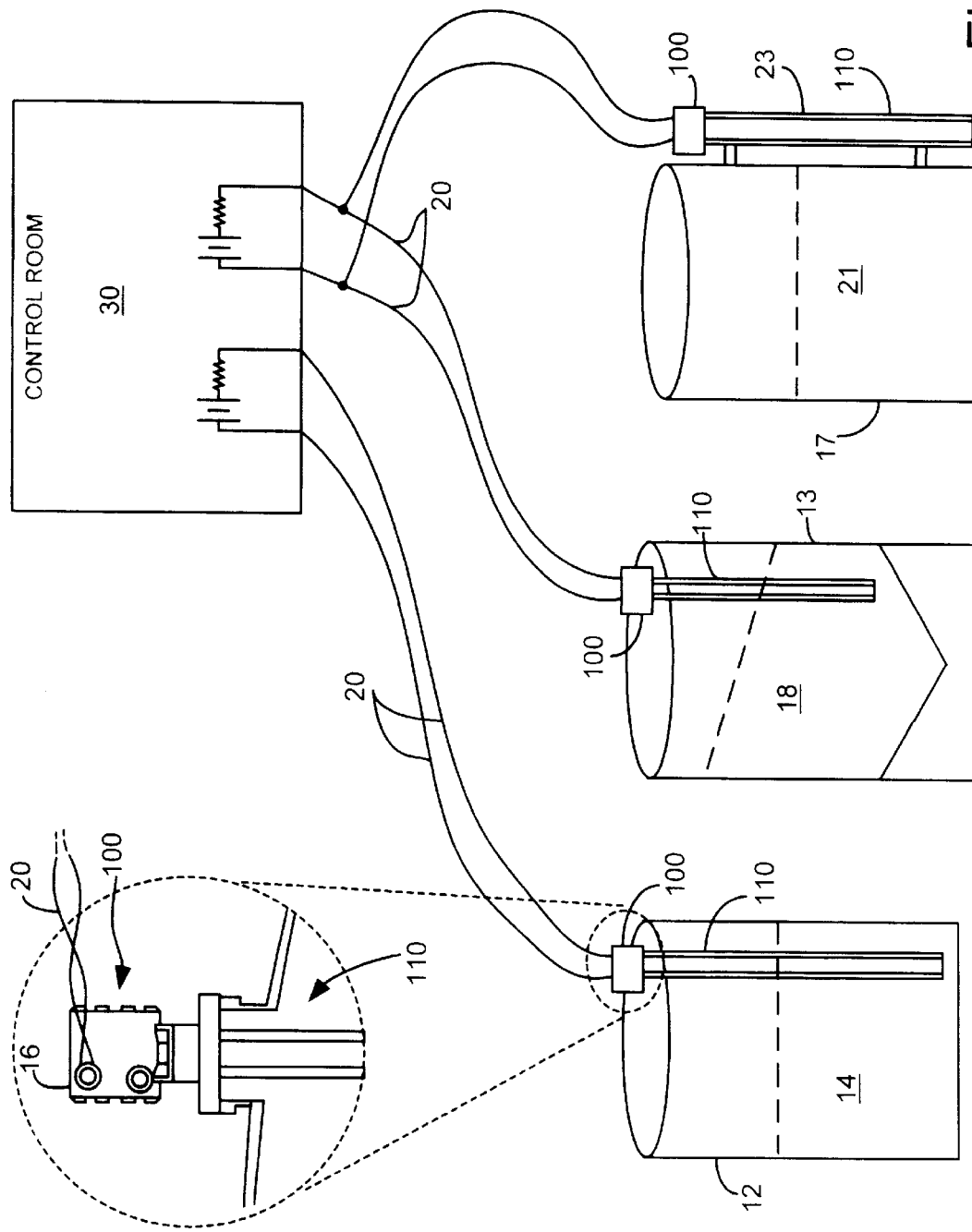
FIG. 1 is a diagram of the environment of low power radar level instruments in accordance with embodiments of the invention.

FIG. 1 illustrates low power radar level transmitters 100 operating in the environment of being mounted to storage tanks 12, 13, and 17 containing process products 14, 18, and 21, respectively. As low power radar transmitters, transmitters 100 can be completely powered by energy received over a 4–20-mA process control loop.

Level transmitters 100 include housings 16 and terminations 110. Transmitters 100 are coupled to process control loops 20 in various configurations as shown in FIG. 1. Transmitters 100 transmit information related to heights of the process products over process control loops 20 to control room 30 (which is modeled as voltage sources and resistances) or to other devices (not shown) coupled to process control loops 20. Loops 20 are sources of power for transmitters 100 and can use any industry standard communications protocol such as 4–20 mA, Profibus, Highway Addressable Remote Transducer (HART®), or FOUNDATION™ Fieldbus. FOUNDATION™ Fieldbus is a multi-drop digital communications protocol intended for connecting field instruments and other process devices in process control systems. The physical layer of the FOUNDATION™ Fieldbus protocol is defined by Instrument Society of America standard ISA-S50.02-1992, and its draft 2 extension dated 1995.

FIG. 1 illustrates various applications in which radar level instruments are useful. For example, process product 14 in tank 12 is a fluid with air disposed above product 14, while process product 18 in tank 13 is a solid (shown with a given angle of repose). Process product 21 in tank 17 is a fluid the level of which is communicated to tube 23 into which one of terminations 110 extends. Although FIG. 1 shows tanks 12, 13, and 17, embodiments may be practiced without tanks such as in a lake or reservoir.

Figure 2:
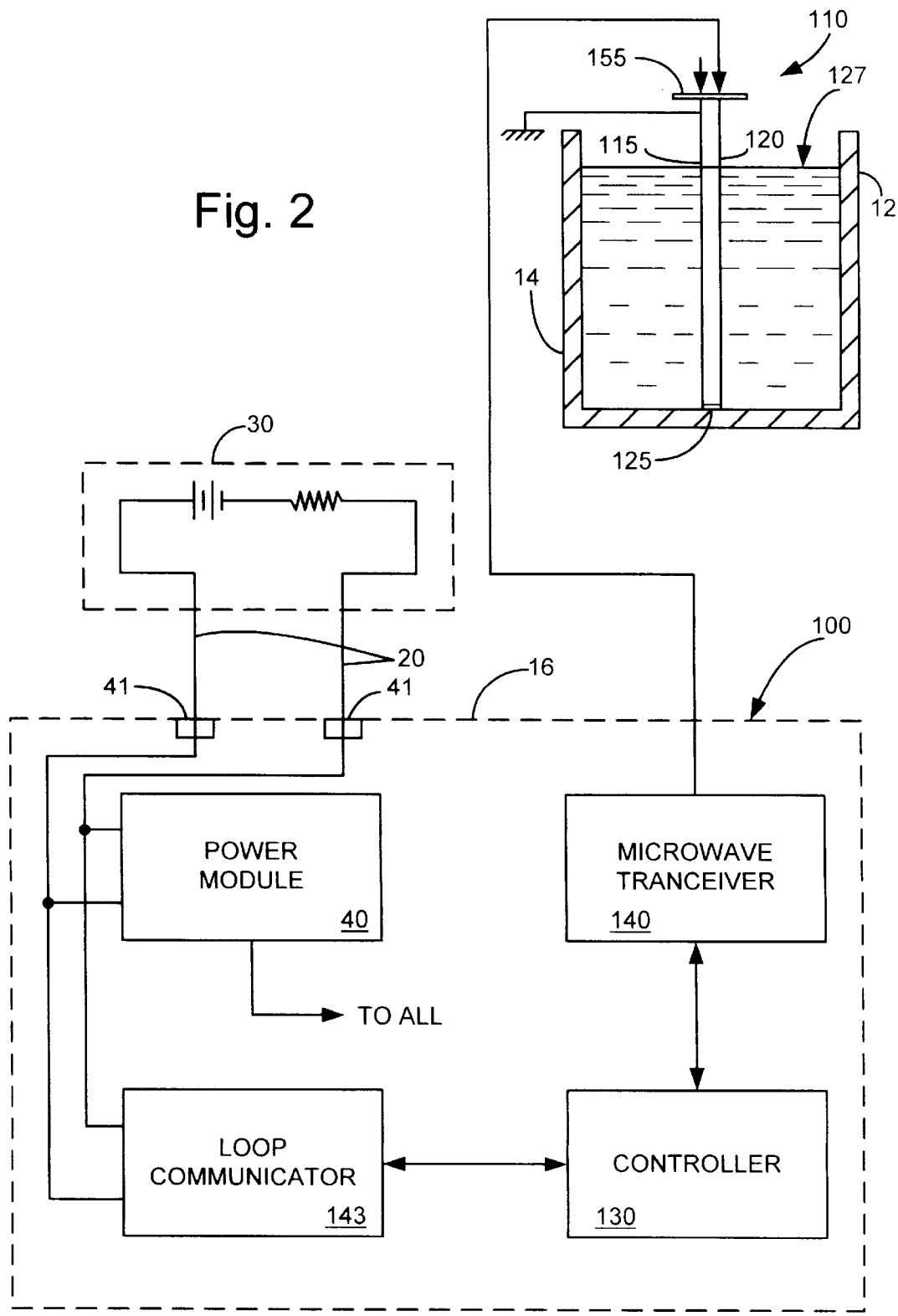
FIG. 2 is a block diagram illustrating circuitry of an embodiment of the invention.

FIG. 2 is a block diagram of low power radar level transmitter 100 coupled to control room 30 over process control loop 20. Electric circuitry carried in housing 16 of transmitter 100 includes controller 130, low power microwave transceiver 140, loop communicator 143 and power module 40. Transmitter 100 also includes termination 110 extending into process product 14 contained in tank 12. For additional information about the components of transmitter 100, as well as the various interactions between those components, see co-pending application Ser. No. 09/321,143, filed May 27, 1999, entitled "Low Power Radar Level Transmitter Having Reduced Ground Loop Errors", assigned to the assignee of the present application.

Termination 110 is extendable into process product 14 in tank 12. Such configuration (where the termination actually contacts process product) is known as contact-type level measurement. Termination 110 is known in the level transmitter art and can be any appropriate transmission line, waveguide or antenna. Termination 110 is also referred to as a contacting probe, or simply a probe. A transmission line is a system of material boundaries forming a continuous path from one place to another and capable of directing transmission of electromagnetic energy along this path. In some embodiments, termination 110 is a twin lead antenna having leads or conductors 115 and 120 connected at bottom region 125 and extendable into product 14 in tank 12, and optionally having launch plate 155. Termination 110 can also be a monopole, coaxial, twin-line, single-line, or microstrip termination with any appropriate number of leads.

Low power microwave transceiver 140 is operatively coupled to termination 110. Transceiver 140 can be any low power microwave transceiver operable within the power constraints of low power radar level transmitter 100. For example, transceiver 140 can be a micropower impulse radar (MIR) transceiver of the type discussed in detail in either of two patents issued to Thomas E. McEwan, U.S. Pat. No. 5,609,059 entitled ELECTRONIC MULTI-PURPOSE MATERIAL LEVEL SENSOR and U.S. Pat. No. 5,610,611 entitled HIGH ACCURACY ELECTRONIC MATERIAL LEVEL SENSOR. Transceiver 140 is adapted to generate a microwave signal that is guided along termination 110 and to receive microwave signals reflected from a reference impedance discontinuity (such as launch plate 155) and interface 127. A reference impedance discontinuity is any component disposed within the path of transmitted microwave signals that has a local impedance that differs stepwise from that of its surroundings. Examples of such discontinuity include launch plate 155, an series capacitor, or any other suitable component. The transmit signal can be at any of a wide range of frequencies, for example between about 250 MHz and about 20 GHz or more. In one embodiment, the frequency of the transmit signal is about 2 GHz. In another embodiment, the transmit signal pulse width ranges from about 200 picoseconds to about 2 nanoseconds corresponding roughly to a frequency between about 500 MHz and 5 GHz. Interface 127 is typically an air/product interface, but can be any boundary between two substances that have different dielectric constants. Thus, interface 127 can be an air/product interface, or a product/product interface where one product is disposed on top of another.

Controller 130 is coupled to microwave transceiver 140 and is adapted to calculate a process product height based upon the reflected microwave signals. Controller 130 is also able to provide a diagnostic signal based upon a characteristic of a first reflected signal, reflected by the reference discontinuity. In some embodiments, the diagnostic signal is based upon the amplitude of the first reflected signal. Controller 130 uses known mathematical functions to derive data from the reflected pulses. Such mathematical functions can, for example, operate upon signal amplitude, signal flight time, signal slope, and signal area. Controller 130 calculates the level of process product 14 as a function of a time of flight of the reflected signal.

Loop communicator 143 is coupled to controller 130 and is couplable to process control loop 20 through terminals 41. Loop communicator 143 is adapted to transmit information related to the process product height, as well as diagnostic information, over process control loop 20. Such information can be transmitted by loop communicator 143 digitally over two-wire loop 20 using any appropriate circuitry such as a known Universal Asynchronous Receiver Transmitter (UART) (not shown). Alternatively, loop communicator 143 can control the loop current level between, for example, 4 and 20 mA using a digital-to-analog converter or other appropriate device. In this manner, transmitter 100 can communicate product height information and diagnostic information to control room 30 or to other controllers or devices coupled to process control loop 20.

Power module 40 is coupled to low power microwave transceiver 140, controller 130, and loop communicator 143. Power module 40 is couplable to process control loop 20 to receive power from loop 20 and provide the received power to low power microwave transceiver 140, controller 130, and loop communicator 143. Power module 40 can also condition the received power for transceiver 140, controller 130, and loop communicator 143.

In operation, transceiver 140 generates microwave signals that are provided to termination 110. As is known in the art, a first reflected portion is reflected at the reference impedance discontinuity (such as launch plate 155) and a second reflected portion is reflected at interface 127 between product 14 and the air (or at the interface between any two materials having different dielectric constants). The reflected first and second portions travel back up leads 115 and 120 of termination 110, and are received by transceiver 140. The reflected first portion is also known as a fiducial pulse. By causing a first reflection (the fiducial pulse) of the microwave signal at discontinuity 155, a convenient reference is made available for comparison to the time that the signal reflected off of interface 127 is received. Typically, the interval between the arrival of the reflected first portion (i.e. the fiducial pulse) and the arrival of the reflected second portion is measured and related to process product level. This time of travel is indicative of the distance traveled by the microwaves, and is thus indicative of the level of product 14 in tank 12. The relationship between the distance traveled and the time of travel is shown in Equation 1

$$D = \left(\frac{1}{\sqrt{\varepsilon_r}}\right) C\left(\frac{T}{2}\right) \qquad \text{Eq. 1}$$

where:
- T/2=one half of the travel time of the microwave pulse (the travel time required for the microwave pulse to travel down the probe to the interface);
- $\varepsilon_r$=the dielectric constant of the material through which the microwave pulse travels (for air, $\varepsilon_r$=1);
- C=the speed of light; and
- D=the distance traveled from the top of the probe to the interface.

One feature of the various embodiments, is the ability to obtain diagnostic information about the termination from the reflected first portion. For example, a comparison between a presently measured fiducial pulse amplitude and a fiducial pulse amplitude measured during normal conditions, yields specific diagnostic information.

Figure 3A:
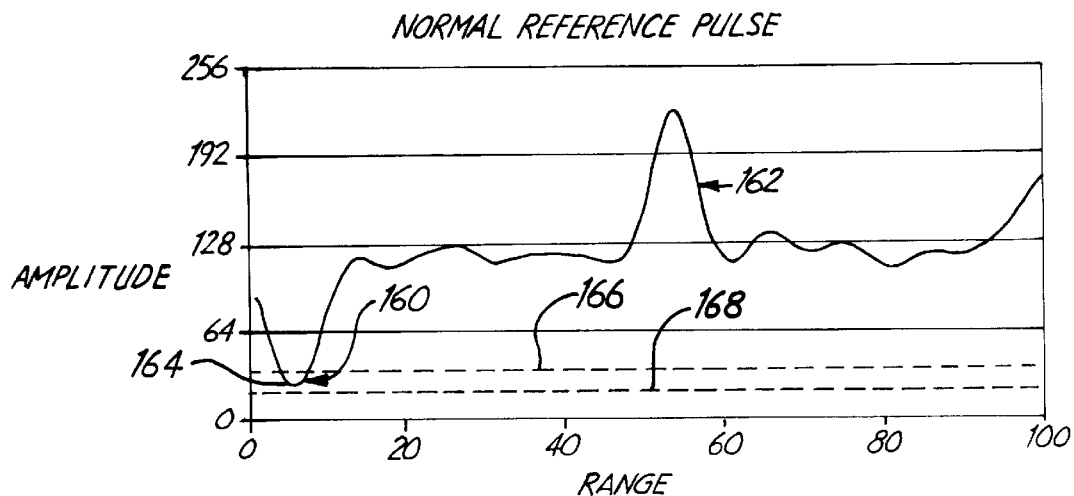
FIGS. 3A–3C are signal diagrams illustrating different operating conditions of low power radar level instruments in accordance with embodiments of the invention.
Figure 3B:
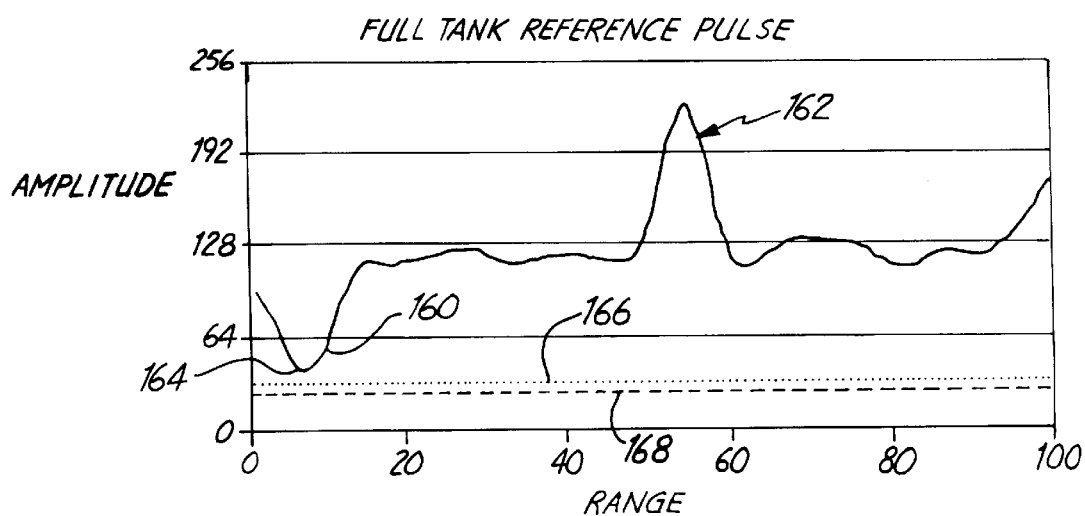
Figure 3C:
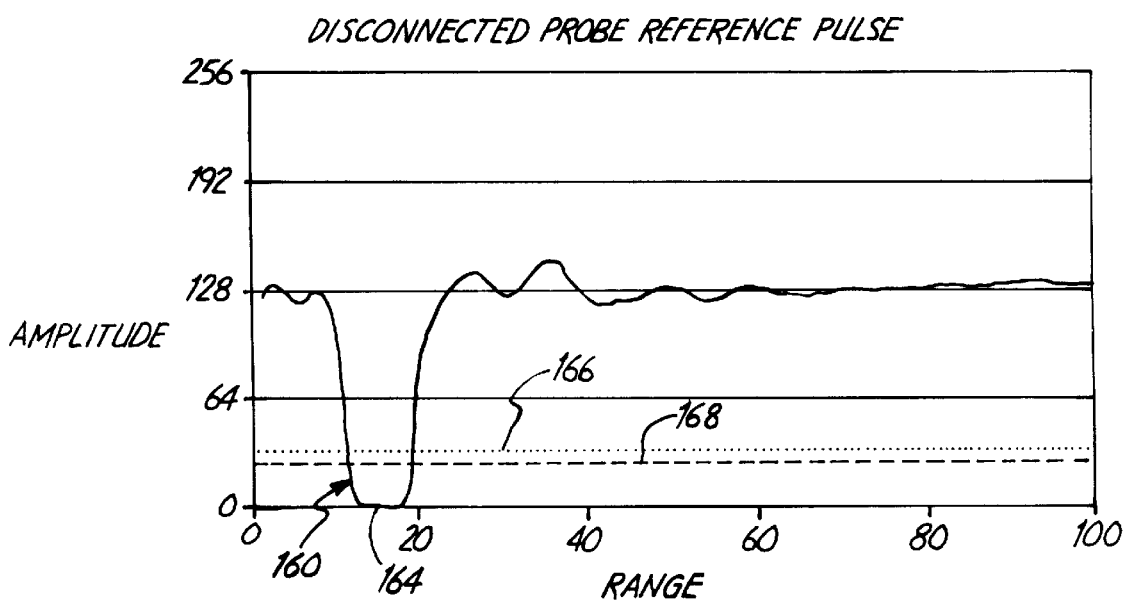

FIGS. 3A–3C are signal diagrams illustrating different operating conditions of low power radar level instruments in accordance with embodiments of the invention.

FIG. 3A is a signal diagram of a microwave transmit signal reflected under normal conditions. The reflected signal includes first reflected portion, or fiducial pulse 160, and second reflected portion 162. As described above, the interval between portions 160 and 162 is indicative of process product height. As can also be seen, pulse 160 includes local minimum or valley 164 that falls between upper limit 166 and lower limit 168. Limits 166 and 168 are typically set when transmitter 100 is commissioned, or during known normal operating conditions, such as during calibration. Thus, when valley 164 is observed to fall within limits 166, 168 a diagnostic output can be provided indicating that transmitter 100 is functioning properly, and that level information can be relied upon.

FIG. 3B is a signal diagram of a microwave transmit signal reflected when termination 110 is fully submerged by process product. Reference impedance discontinuity 155 is accessible by process product such that the submersion of discontinuity 155 by process product so alters the reflection of the fiducial pulse that the submerged condition can be diagnosed. Thus, when valley 164 of fiducial pulse 160 falls above upper limit 166, diagnostic information indicative of a submerged termination can be provided. The diagnostic information can be in the form of an alarm, or other suitable forms, such as an indication of reliability of level information. This diagnostic information is especially useful in displacer cage embodiments (See FIG. 1, tank 21) where the probe can be fully submerged or have air gap near the reference discontinuity. The air gap can cause inaccuracies in the level information due to the differences of dielectric constants between air and liquid. Thus, level instruments in accordance with various embodiments, can calculate whether an air gap is present, and select the appropriate dielectric constant for process product level calculation.

FIG. 3C is a signal diagram of a microwave transmit signal reflected when the coupling between termination 110 and transceiver 140 has been severed or otherwise degraded. As can be seen, valley 164 of pulse 160 falls below lower threshold 168. This signal results from a break between termination 110 and transceiver 140. In essence, the reference impedance discontinuity is replaced with a cable/air discontinuity. Such replacement causes the amplitude of pulse 160 to increase or saturate. Transmitter 100 identifies such condition and provides suitable diagnostic information.

Although, embodiments of diagnostic low power radar level instruments are described with respect to upper and lower limits 166, 168, it is noted that embodiments can also be practiced with a single limit. For example, if diagnostic information indicative of a submerged termination is all that is desired, a single threshold can be used. Thus, a comparison between valley 164 and the single threshold would provide the desired diagnostic information.

Figure 4:
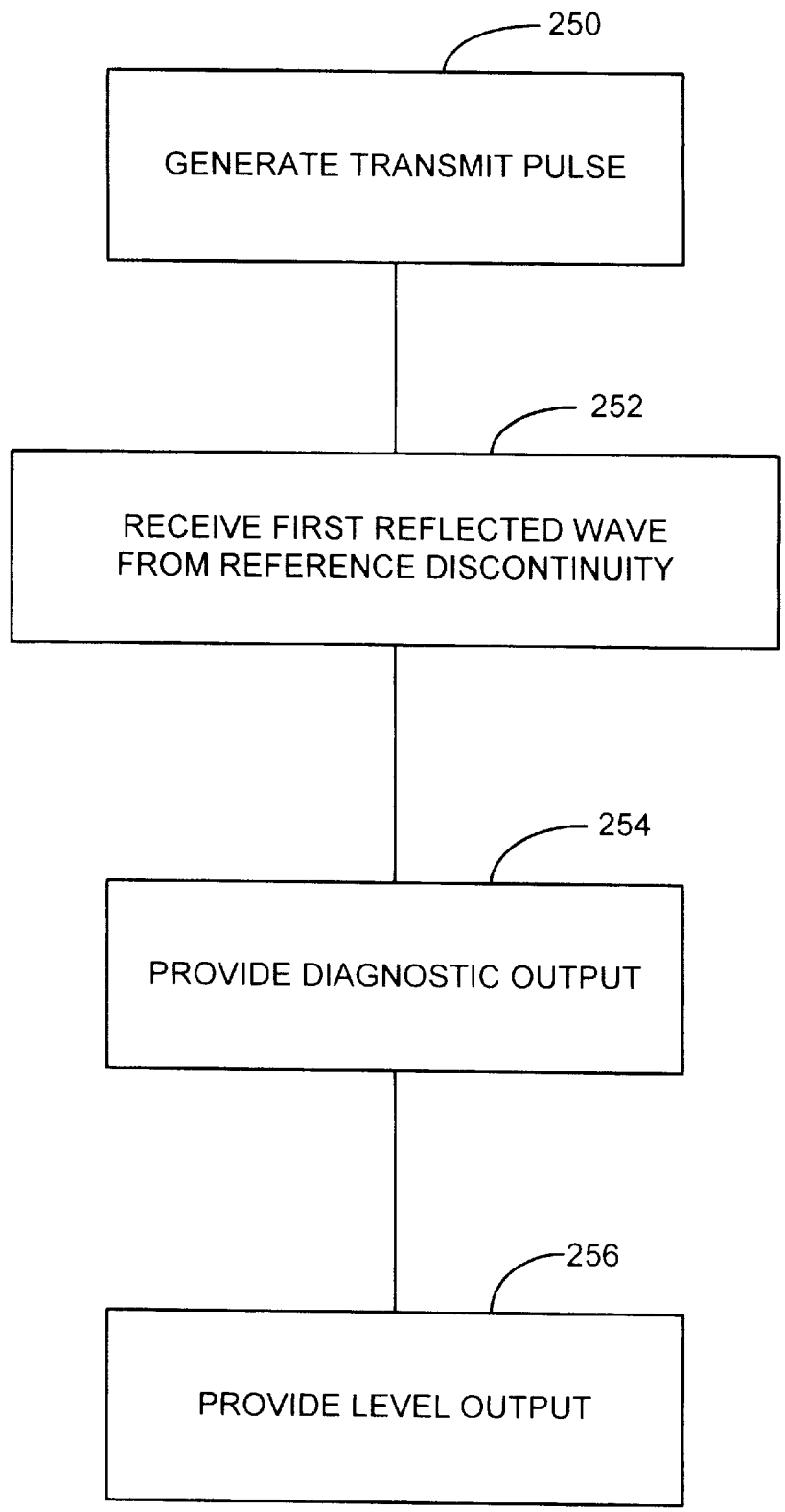
FIG. 4 is a system block diagram illustrating a method of providing a diagnostic output in accordance with an embodiment of the invention.

FIG. 4 is a block diagram illustrating a method in accordance with an embodiment of the invention. The method begins at block 250 where a microwave signal is generated and directed along a microwave termination through a reference impedance discontinuity. At block 252, a first portion of the microwave signal is reflected at a reference impedance discontinuity and received. At block 254, diagnostic information is calculated based upon a characteristic of the first reflected portion. The diagnostic information can be based upon amplitude of the first reflected portion, and can be indicative of a normal operating condition, a submerged termination condition, or a disconnected termination condition. At optional block 256, the process product height can be calculated based upon reception of the first portion, and reception of a second portion reflected from a process product interface.

What is claimed is:

1. A low power radar level instrument with enhanced diagnostics, the instrument comprising:
    - a probe having a reference impedance discontinuity and extendable into a process product through a process product interface;
    - a transceiver coupled to the probe, the transceiver adapted to generate a microwave transmit pulse which is transmitted along the probe into the process product, a first portion of the transmit pulse being reflected at the reference impedance discontinuity and forming a first reflected wave pulse, and a second portion of the transmit pulse being reflected at the product interface and forming a second reflected wave pulse, wherein the transceiver is also adapted to receive the reflected first and second portions; and
    - a processor coupled to the transceiver and adapted to provide a diagnostic signal as a function of amplitude of the reflected first portion, and adapted to provide a level output indicative of process product height based upon time of detection of the reflected second portion.

2. The instrument of claim 1, wherein the reference impedance discontinuity comprises a launch plate.

3. The instrument of claim 1, wherein the transceiver is a micropower impulse radar transceiver.

4. The instrument of claim 1, wherein the instrument is a radar level transmitter couplable to a process control loop, and adapted to transmit the level output on the process control loop.

5. The instrument of claim 4, and further comprising a loop communicator adapted to transmit the level output in accordance with a process industry standard protocol.

6. The instrument of claim 5, wherein the protocol is selected from the group consisting of Highway Addressable Remote Transducer, and FOUNDAION Fieldbus.

7. The instrument of claim 4, wherein the process control loop is a 4–20 mA process control loop.

8. The instrument of claim 4, wherein the transmitter is wholly powered by the process control loop.

9. The instrument of claim 1, wherein the diagnostic output is indicative of a condition in which the probe is fully submersed by process fluid.

10. The instrument of claim 1, wherein the diagnostic output is indicative of a condition in which the probe is disconnected from the instrument.

11. The instrument of claim 1, wherein the pulse width of the microwave transmit pulse ranges from about 200 picoseconds to about 2 nanoseconds.

12. The instrument of claim 1, wherein the diagnostic signal is based upon a comparison of amplitude of the reflected first portion and at least one pre-selected limit.

13. The instrument of claim 12, wherein the at least one pre-selected limit includes an upper limit and a lower limit.

14. A low power radar level instrument with enhanced diagnostics, the instrument comprising:
   means for guiding microwave energy through a reference impedance discontinuity and into a process product through a process product interface;
   means for generating a microwave transmit pulse that is transmitted along the means for guiding, a first portion of the transmit pulse being reflected at the reference impedance discontinuity and forming a first reflected wave pulse, and a second portion of the transmit pulse being reflected at the product interface and forming a second reflected wave pulse;
   means for receiving the reflected wave pulses; and
   means for providing a diagnostic signal as a function of amplitude of the reflected first portion, and for providing a level output indicative of process product height based upon time of detection of the reflected second portion.

15. A method of providing enhanced diagnostics with a low power radar level instrument, the method comprising:
   generating a microwave transmit pulse and directing the transmit pulse through a reference impedance discontinuity;
   receiving a first reflected wave from the reference impedance discontinuity; and
   providing a diagnostic output based upon a characteristic of the first reflected wave.

16. The method of claim 15, wherein the characteristic is wave amplitude.

17. The method of claim 15, wherein the diagnostic output is indicative of whether the reference discontinuity is at least partially submerged in process fluid.

18. The method of claim 15, wherein the diagnostic output is indicative of a electrical break in a microwave waveguide.

19. The method of claim 15, and further comprising:
   directing the microwave transmit pulse to a process product interface;
   receiving a second reflected wave portion from the process product interface;
   providing a process product level output based upon reception of the second reflected wave portion.

20. The method of claim 15, wherein providing the diagnostic output includes comparing the amplitude of the first reflected wave with at least one pre-selected limit.

21. A computer readable medium having stored instructions for execution on a processor associated with a low-power radar level instrument, the medium comprising:
   instructions for causing a low-power microwave instrument to generate a microwave transmit pulse that is transmitted along a waveguide, a first portion of the transmit pulse being reflected at a reference impedance discontinuity and forming a first reflected wave pulse, and a second portion of the transmit pulse being reflected at a product interface and forming a second reflected wave pulse;
   instructions for receiving the reflected wave pulses; and
   instructions for providing a diagnostic signal as a function of amplitude of the reflected first portion, and for providing a level output indicative of process product height based upon time of detection of the reflected second portion.

* * * * *

UNITED STATES PATENT AND TRADEMARK OFFICE
CERTIFICATE OF CORRECTION

PATENT NO. : 6,295,018 B1
DATED : September 25, 2001
INVENTOR(S) : Diede et al.

It is certified that error appears in the above-identified patent and that said Letters Patent is hereby corrected as shown below:

<u>Claim 6,</u>
Please delete "FOUNDAION" and replace with -- FOUNDATION --.

<u>Claim 18,</u>
Please replace "a" first occurrence with -- an --.

Signed and Sealed this

Ninth Day of April, 2002

Attest:

JAMES E. ROGAN
Attesting Officer
Director of the United States Patent and Trademark Office